United States Patent
Swallow et al.

(10) Patent No.: US 7,780,062 B2
(45) Date of Patent: Aug. 24, 2010

(54) SOLID STATE JOINING METHOD FOR CONTINUOUS STRUCTURES

(75) Inventors: Christopher H Swallow, Eureka, MO (US); Eric J Stern, Valmeyer, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/693,195

(22) Filed: Jan. 25, 2010

(65) Prior Publication Data

US 2010/0119771 A1    May 13, 2010

Related U.S. Application Data

(62) Division of application No. 11/837,372, filed on Aug. 10, 2007, now Pat. No. 7,694,867.

(51) Int. Cl.
*B23K 20/12* (2006.01)

(52) U.S. Cl. .................. 228/112.1; 228/2.1; 228/113

(58) Field of Classification Search .......... 228/2.1, 228/112.1, 113
See application file for complete search history.

(56) References Cited

U.S. PATENT DOCUMENTS

| | | | |
|---|---|---|---|
| 5,975,406 A | 11/1999 | Mahoney et al. | |
| 6,742,697 B2 | 6/2004 | McTernan et al. | |
| 6,779,708 B2 | 8/2004 | Slattery | |
| 6,799,708 B2 | 10/2004 | Von Strombeck et al. | |
| 6,910,616 B2 | 6/2005 | Halley et al. | |
| 7,083,076 B2 | 8/2006 | Slattery | |
| 7,225,967 B2 | 6/2007 | Slattery | |
| 7,398,911 B2 | 7/2008 | Slattery et al | |
| 7,431,194 B2 | 10/2008 | Slattery | |
| 7,694,867 B2* | 4/2010 | Swallow et al. | 228/112.1 |
| 2004/0004108 A1 | 1/2004 | Halley et al. | |
| 2004/0094604 A1 | 5/2004 | Halley et al. | |
| 2005/0127139 A1 | 6/2005 | Slattery et al. | |
| 2006/0213953 A1 | 9/2006 | Slattery | |

OTHER PUBLICATIONS

Thompson Friction Welding, Linear Friction Welding, http://www.thompson-friction-welding.co.uk, date unknown.

* cited by examiner

*Primary Examiner*—Jessica L. Ward
*Assistant Examiner*—Kevin E Yoon
(74) *Attorney, Agent, or Firm*—Klintworth & Rozenblat IP LLC

(57) ABSTRACT

An assembly may include at least two structures having angled edges disposed adjacent to one another forming a first gap between the at least two structures. A plurality of angled joining members may be linear friction welded adjacent to one another between the adjacent angled edges of the at least two structures in the first gap. A second gap may be disposed between the plurality of linear friction welded angled joining members. At least one hole may be disposed at a location of the second gap. The at least one hole may extend into and between adjacent edges of the welded angled joining members, and may extend into and between the adjacent angled edges of the at least two structures. A plug member may be rotary friction welded at least partially into the at least one hole.

15 Claims, 6 Drawing Sheets

SOLID STATE JOINING METHOD FOR CONTINUOUS STRUCTURES

CROSS-REFERENCE TO RELATED APPLICATIONS

This application claims priority to and is a divisional of U.S. patent application Ser. No. 11/837,372 filed Aug. 10, 2007, which is hereby incorporated by reference.

BACKGROUND

Often, large structures are produced from even larger pieces of material. For instance, a large piece of material may be machined to remove scrap or waste material in order to produce the desired structure. This may lead to a large amount of scrap or waste material, which may be costly and inefficient.

A solid state method for joining structures, and a solid state joined structure apparatus, is needed to decrease one or more problems associated with one or more of the existing methods and/or apparatus.

SUMMARY

In one aspect of the disclosure, an assembly is provided. The assembly may include at least two structures having angled edges disposed adjacent to one another forming a first gap between the at least two structures. A plurality of angled joining members may be linear friction welded adjacent to one another between the adjacent angled edges of the at least two structures in the first gap. A second gap may be disposed between the plurality of linear friction welded angled joining members. At least one hole may be disposed at a location of the second gap. The at least one hole may extend into and between adjacent edges of the welded angled joining members, and may extend into and between the adjacent angled edges of the at least two structures. A plug member may be rotary friction welded at least partially into the at least one hole.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
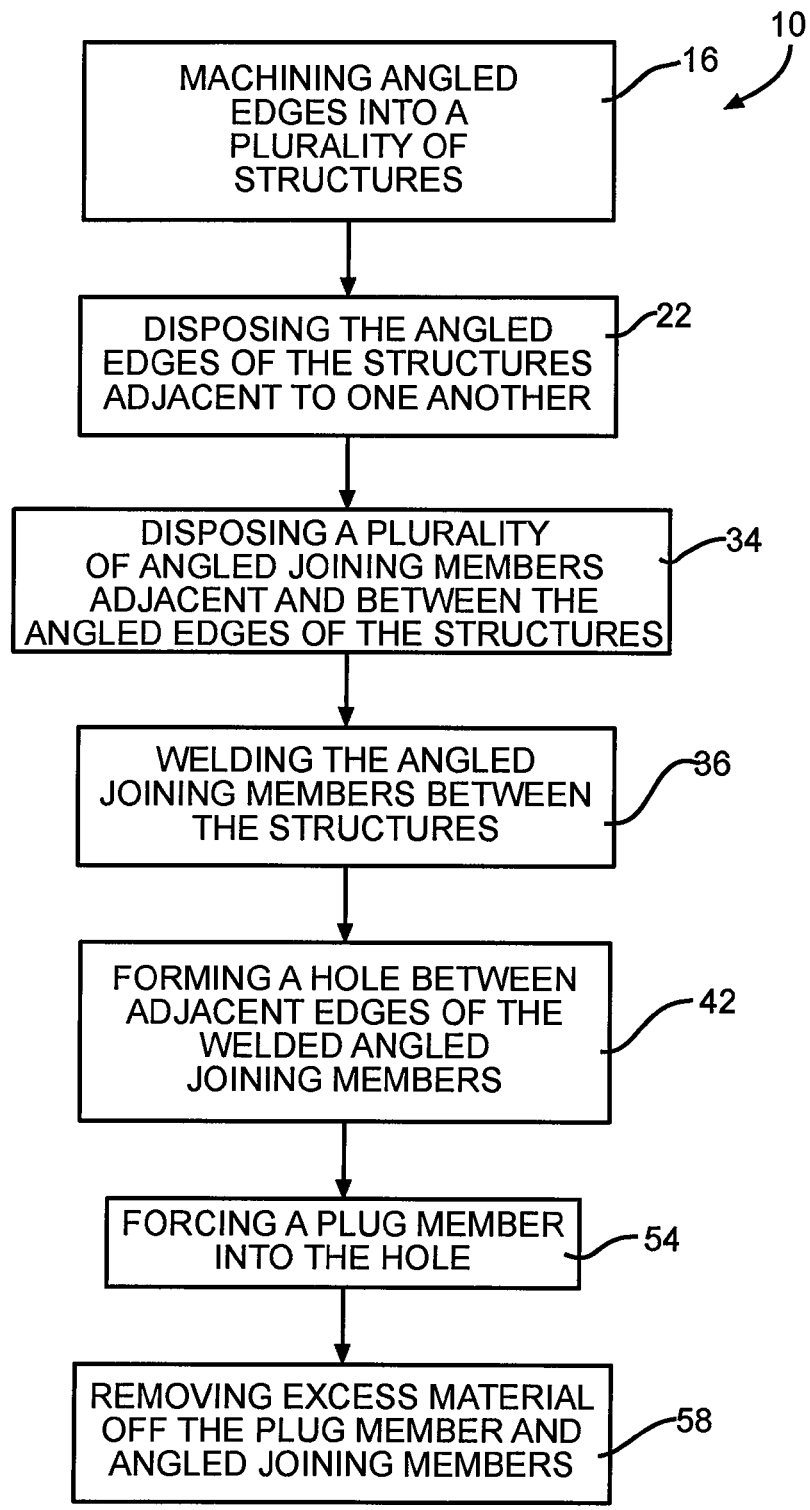
FIG. 1 shows a flowchart of one embodiment of a solid state method for joining structures.
Figure 2:
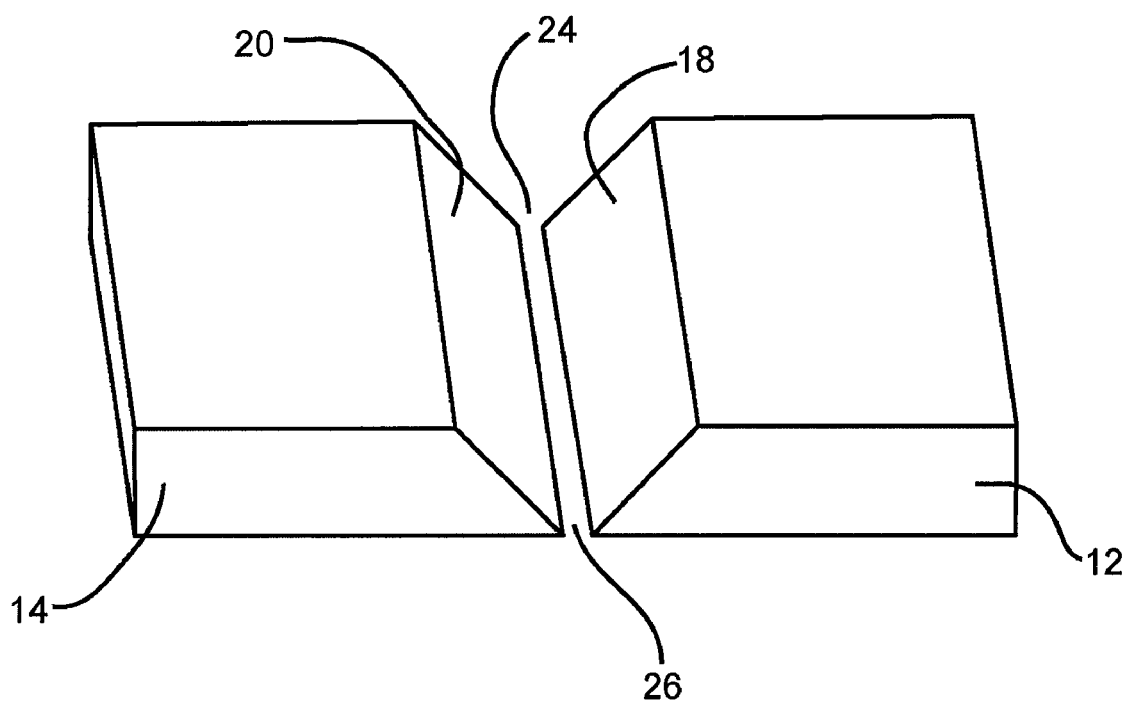
FIG. 2 shows a top perspective view of a plurality of structures to be joined using the solid state method of FIG. 1.

FIG. 1 shows a flowchart of one embodiment 10 of a solid state method for joining structures. FIG. 2 shows a top perspective view of a plurality of structures 12 and 14 to be joined under the solid state method 10 of FIG. 1. The structures 12 and 14 may comprise parts of an aircraft. In other embodiments, the structures 12 and 14 to be joined may comprise non-aircraft parts. In other embodiments, any number of structures may be joined under the method 10. For instance, more than two structures may be joined under the method 10. In one step 16, angled edges 18 and 20 may be milled into each of the structures 12 and 14. In other embodiments, varied number, shape, orientation, and configuration surfaces may be machined, utilizing any known process, into any number of structures to be joined. In another step 22, as shown in FIGS. 1 and 2, the angled edges 18 and 20 of the structures 12 and 14 may be disposed adjacent to one another. A cavity 24 and first gap 26 may be formed between the adjacent angled edges 18 and 20 of the structures 12 and 14. In other embodiments, the structures 12 and 14 may be disposed in varying orientations and configurations, forming varying shaped cavities and/or gaps.

Figure 3:
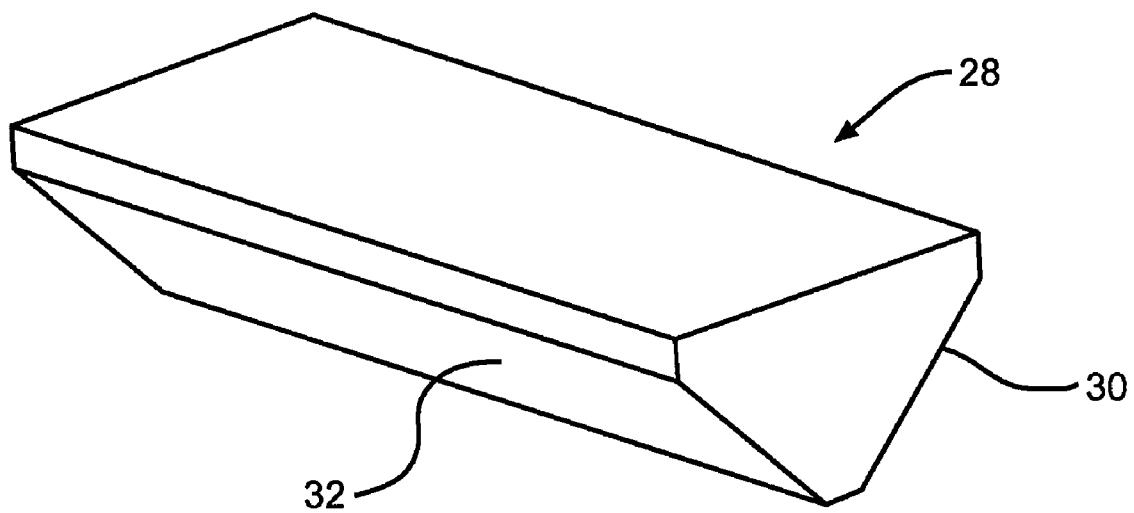
FIG. 3 shows a top perspective view of an angled joining member having angled surfaces which may be used to join the structures of FIG. 2 using the method of FIG. 1.
Figure 4:
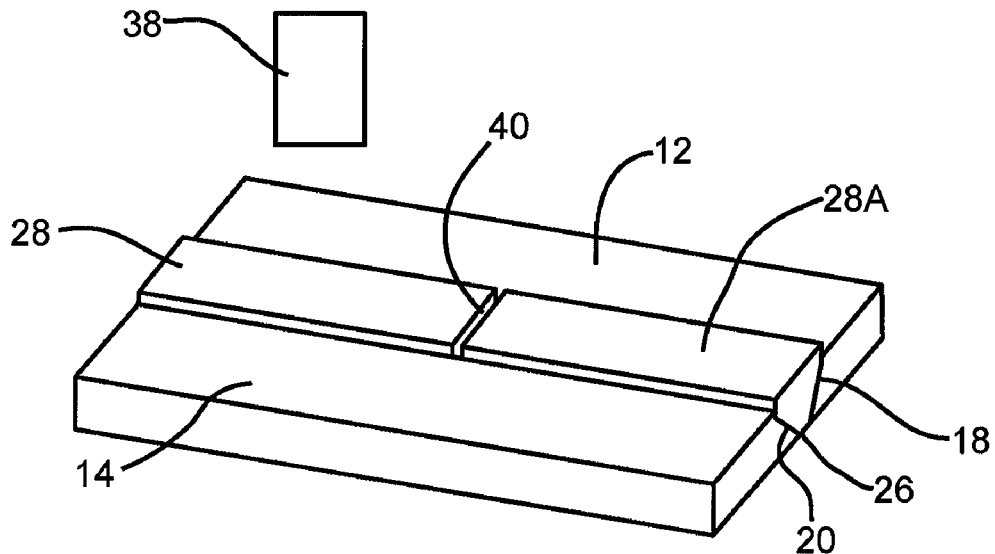
FIG. 4 shows a top perspective view of two of the angled joining members of FIG. 3 being disposed and welded adjacent to one another between adjacent angled edges of the structures being joined in FIG. 2 using the method of FIG. 1.

FIG. 3 shows a top perspective view of an angled joining member 28 having angled surfaces 30 and 32. The angled joining member 28 may comprise a keystone member. In step 34, as shown in FIGS. 1 and 4, two identical angled joining members 28 and 28A may be disposed adjacent to one another between the adjacent angled edges 18 and 20 of the structures 12 and 14. The plurality of angled joining members 28 and 28A may be disposed into the first gap 26 disposed between the plurality of structures 12 and 14. The angled joining members 28 and 28A may be disposed and aligned linearly between the adjacent angled edges 18 and 20 of the structures 12 and 14. In other embodiments, any number of angled joining members 28 and 28A may be disposed in varying configurations and orientations between the adjacent angled edges 18 and 20 of the structures 12 and 14. For instance, in one embodiment, more than two angled joining members 28 and 28A may be disposed between adjacent angled edges 18 and 20 of two or more structures 12 and 14.

In step 36, as shown in FIGS. 1 and 4, the angled joining members 28 and 28A may be welded in place between the adjacent angled edges 18 and 20 of the structures 12 and 14 utilizing a welding member 38. The plurality of angled joining members 28 and 28A may be welded into the first gap 26 disposed between the plurality of structures 12 and 14. The welding member 38 may comprise a linear friction welding member. In other embodiments, various types of welding devices may be utilized, and any number of angled joining members 28 and 28A may be welded in place between the structures 12 and 14. For instance, in one embodiment, more than two angled joining members may be welded in place to two or more structures. A second gap 40 may be formed between the welded angled joining members 28 and 28A as a result of the linear friction welding. In other embodiments, a second gap 40 may be formed between every two welded together angled joining members 28 and 28A.

Figure 5:
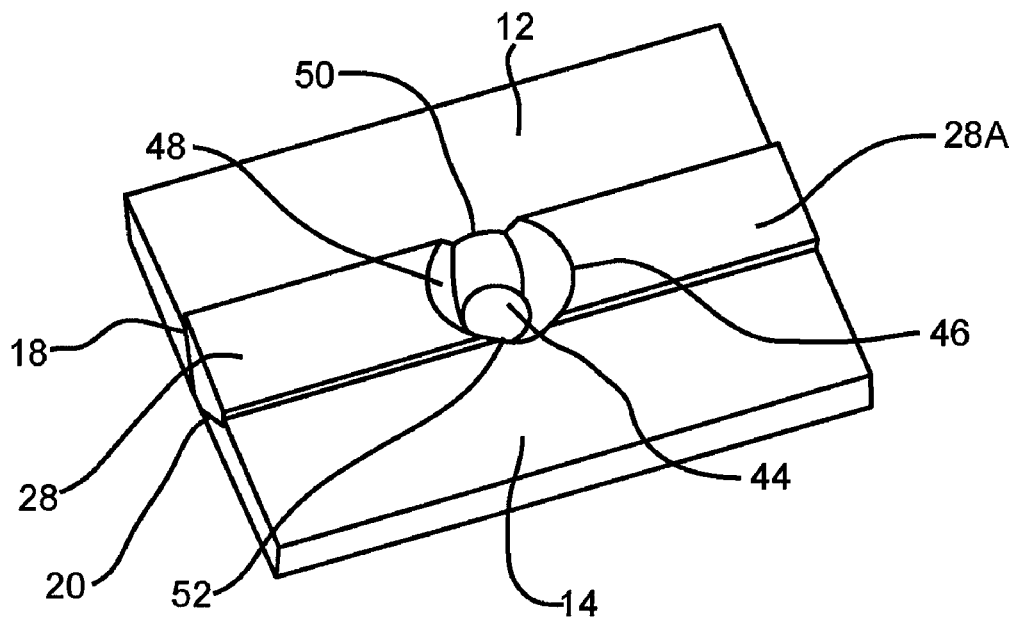
FIG. 5 shows a top perspective view of a hole being formed into and extended between adjacent edges of the welded angled joining members of FIG. 4 using the method of FIG. 1.

In step 42, as shown in FIGS. 1 and 5, a hole 44 may be formed into and extended between adjacent edges 46 and 48 of the welded angled joining members 28 and 28A. The hole 44 may also be formed into and extend between portions 50 and 52 of the angled edges 18 and 20 of the structures 12 and 14. The hole 44 may be cone-shaped, and may be milled. In other embodiments, the hole 44 may be a variety of shape, and may be machined using other processes. In still other embodiments, there may be a plurality of holes 44. For instance, in one embodiment, one hole 44 may be formed between adjacent edges 46 and 48 of every two welded angled joining members 28 and 28A.

Figure 6:
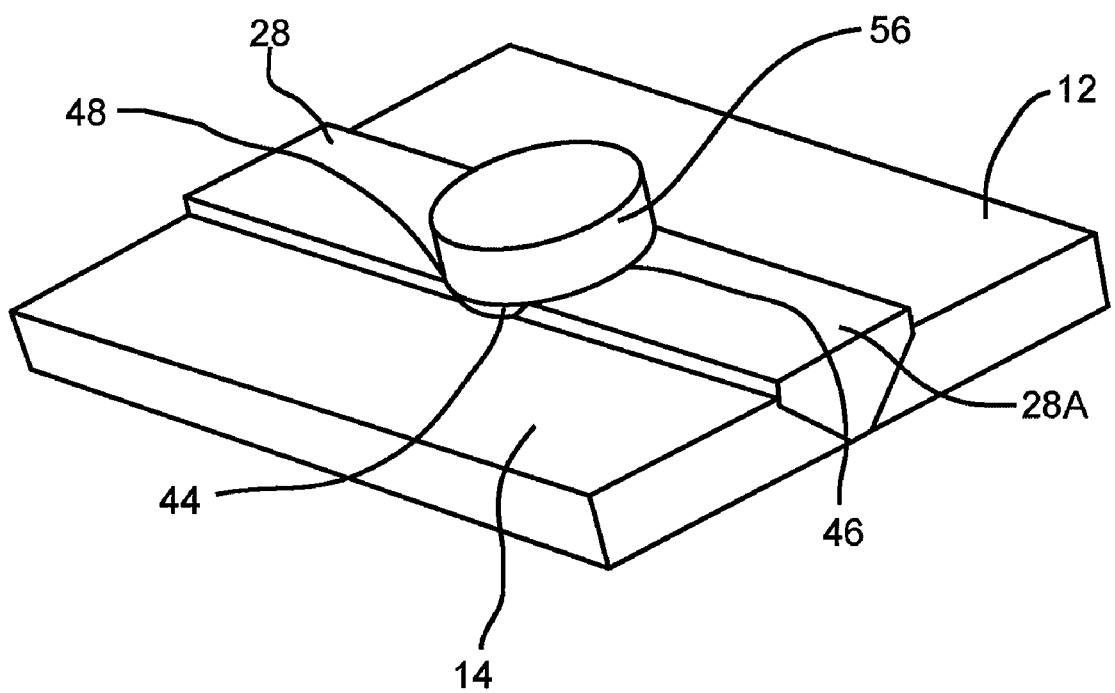
FIG. 6 shows a top perspective view of a plug member being forced at least partially into the hole of FIG. 5 using the method of FIG. 1.

In step 54, as shown in FIGS. 1 and 6, a plug member 56 may be forced at least partially into the hole 44. The plug member 56 may be cone-shaped. In other embodiments, the plug member 56 may have varying shapes. The plug member 56 may be forced at least partially into the hole 44 utilizing rotary friction welding. In other embodiments, varying forcing mechanisms may be used. In still other embodiments, a separate plug member 56 may be forced at least partially into each of a plurality of holes 44 disposed between adjacent edges 46 and 48 of a plurality of welded angled joining members 28 and 28A.

Figure 7:
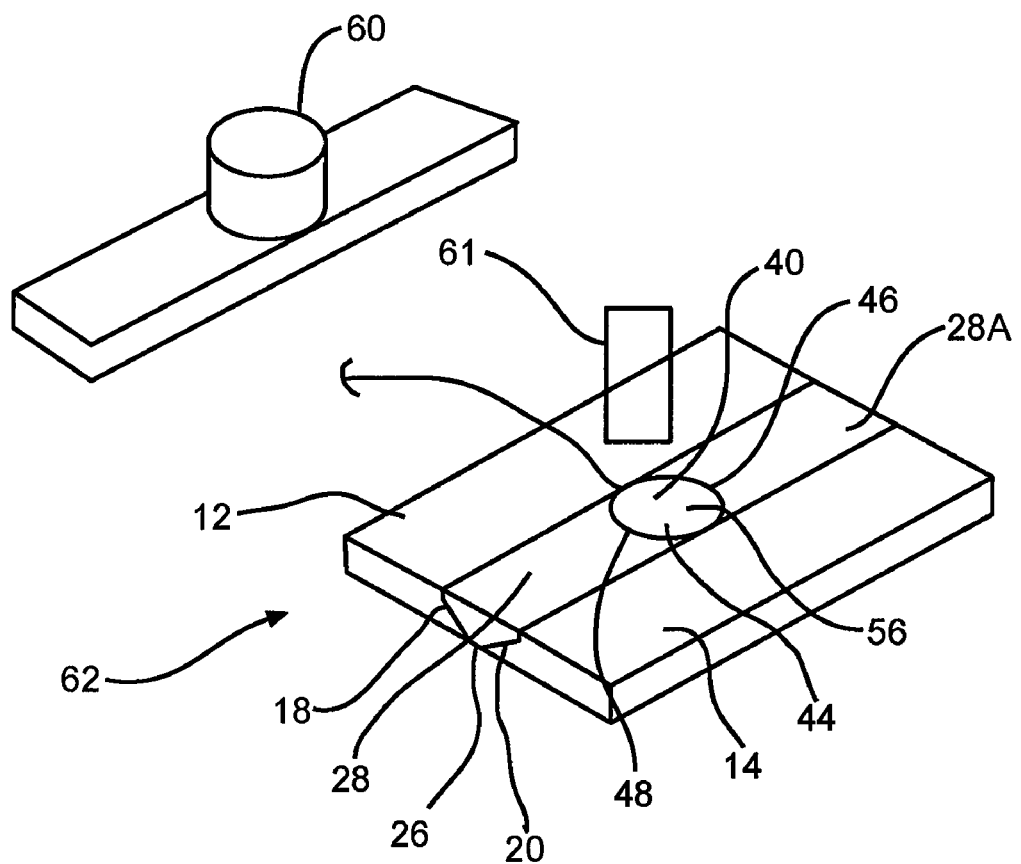
FIG. 7 shows a top perspective view of excess material having been removed off the plug member and the angled joining members of FIG. 6 to form a solid state joined structure apparatus using the method of FIG. 1.

In step 58, as shown in FIGS. 1 and 7, excess material 60 may be removed off the plug member 56 and the angled joining members 28 and 28A using a removal device 61 to form a solid state joined structure apparatus 62. In one embodiment, the excess material 60 may be milled off. In still other embodiments, the excess material may be machined off using varying mechanisms.

By using two or more joining members 28 and 28A and one or more plug members 56, two or more structures 12 and 14 may be joined in order to produce a solid state joined structure apparatus 62 comprising a large continuous structure while limiting the amount of scrap or excess material 60. In such manner, a continuous structure of any size, orientation, configuration, and shape may be produced by using a pre-determined combination of joining members 28, plug members 56, and structures 12 and 14 in the appropriate numbers, sizes, shapes, orientations, and configurations.

In another embodiment, as shown in FIG. 7, a solid state joined structure apparatus 62 may include the following: a plurality of structures 12 and 14 having angled edges 18 and 20 disposed adjacent to one another; a plurality of angled joining members 28 and 28A disposed adjacent to one another and welded between the adjacent angled edges 18 and 20 of the plurality of structures 12 and 14; at least one hole 44 formed into and extending between adjacent edges 46 and 48 of the welded angled joining members 28 and 28A; and a plug member 56 at least partially forced into the at least one hole 44. The plurality of structures 12 and 14 may comprise parts of an aircraft. The angled edges 18 and 20 may have been milled into the plurality of structures 12 and 14.

The plurality of angled joining members 28 and 28A may comprise keystone members which are disposed and welded linearly, using linear friction welding, between the adjacent angled edges 18 and 20 of the plurality of structures 12 and 14. The plurality of angled joining members 28 and 28A may be disposed and welded into a first gap 26 disposed between the plurality of structures 12 and 14. The at least one hole 44 may be a cone-shaped hole formed by a milling process. The at least one hole 44 may have been formed into at least one second gap 40 disposed between the welded angled joining members 28 and 28A. The plug member 56 may be cone-shaped, and may have been at least partially forced into the at least one hole 44 utilizing rotary friction welding.

Excess material 60 may have been removed off the plug member 56 and the angled joining members 28 and 28A. The excess material 60 may have been milled off the plug member 56 and the angled joining members 28 and 28A. In other embodiments, more than two angled joining members 28 and 28A may be disposed and welded between adjacent angled edges 18 and 20 of a plurality of structures 12 and 14, more than one hole 44 may be formed into and extended between adjacent edges 46 and 48 of the welded angled joining members 28 and 28A, and a separate plug member 56 may be at least partially forced into each of the holes 44.

It should be understood, of course, that the foregoing relates to exemplary embodiments of the disclosure and that modifications may be made without departing from the spirit and scope of the disclosure as set forth in the following claims.

The invention claimed is:

1. An assembly comprising:
   at least two structures having angled edges disposed adjacent to one another forming a first gap between the at least two structures;
   a plurality of angled joining members linear friction welded adjacent to one another between said adjacent angled edges of said at least two structures in the first gap;
   a second gap disposed between the plurality of linear friction welded angled joining members;
   at least one hole disposed at a location of the second gap, the at least one hole extending into and between adjacent edges of the welded angled joining members, and extending into and between the adjacent angled edges of said at least two structures; and
   a plug member rotary friction welded at least partially into said at least one hole.

2. The assembly of claim 1 wherein excess material is removed from the plug member and the angled joining members.

3. The assembly of claim 2 wherein the removed excess material comprises milled excess material.

4. The assembly of claim 1 wherein the angled edges are milled into said at least two structures.

5. The assembly of claim 1 wherein said at least two structures comprise parts of an aircraft.

6. The assembly of claim 1 wherein the plurality of angled joining members are linearly welded between said adjacent angled edges of said at least two structures.

7. The assembly of claim 1 wherein the plurality of angled joining members are keystone members.

8. The assembly of claim 1 wherein the at least one hole is cone-shaped.

9. The assembly of claim 1 wherein the at least one hole is milled.

10. The assembly of claim 1 wherein the plug member is cone-shaped.

11. The assembly of claim 1 wherein more than two angled joining members are linear friction welded adjacent to one another between said adjacent angled edges of said at least two structures in the first gap, more than one hole is disposed at the location of the second gap extending into and between the adjacent edges of the welded angled joining members and extending into and between the adjacent angled edges of said at least two structures, and separate plug members are rotary friction welded at least partially into each of said holes.

12. The assembly of claim 1 wherein the assembly comprises a solid state joined structure.

13. The assembly of claim 1 wherein the plug member is rotary friction welded against each of the adjacent linear friction welded angled joining members and against each of the adjacent angled edges of the at least two structures.

14. The assembly of claim 1 wherein the at least two structures comprise varying sizes or shapes.

15. The assembly of claim 1 wherein sizes or shapes of the angled joining members are varied.

* * * * *